July 21, 1936.  T. A. ABBOTT ET AL  2,048,534
VOLT AMPERE HOUR METER
Filed Oct. 15, 1935
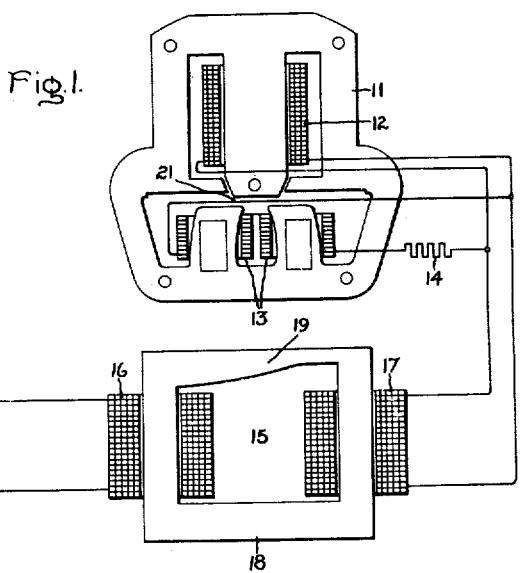
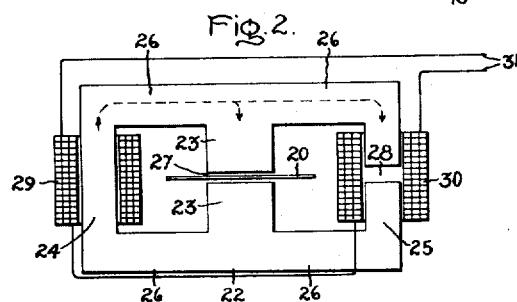
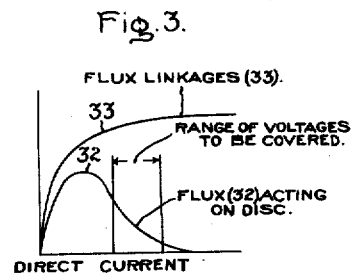
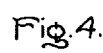
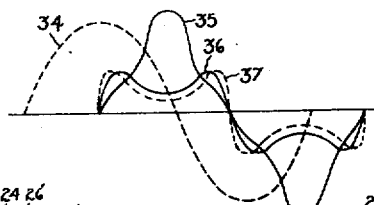
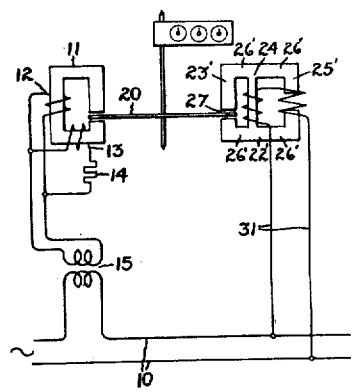
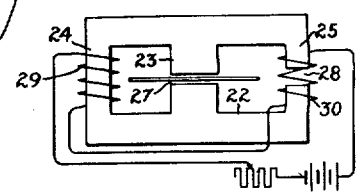
Inventors:
Thomas A. Abbott,
Allen T. Sinks,
by Harry E. Dunham
Their Attorney.

Patented July 21, 1936

2,048,534

UNITED STATES PATENT OFFICE 2,048,534

VOLT AMPERE HOUR METER

Thomas A. Abbott, Marblehead, and Allen T. Sinks, Beach Bluff, Mass., assignors to General Electric Company, a corporation of New York Application October 15, 1935, Serial No. 45,022

7 Claims. (Cl. 171—34)

Our invention relates to electric-measuring devices and concerns particularly integrating meters and devices for measuring apparent power or volt amperes in alternating-current circuits.

It is an object of our invention to provide a rugged reliable volt-ampere hour meter of relatively simple construction without moving parts other than the usual induction disc rotor and the associated mechanism driven by the rotor.

Another object of our invention it to provide an ampere-hour meter of improved construction.

It is also an object of our invention to provide a device responsive to the square root of a current or for producing a current varying as the square root of another current.

Still another object is to provide an improved induction disc damping element producing a restraining torque varying inversely with voltage.

Other and further objects and advantages will become apparent as the description proceeds.

In accordance with our invention in its preferred form, we utilize an integrating meter mechanism similar in construction to that used in watt-hour meters, but we utilize both current and potential coils as current coils and we provide a damping arrangement for producing a restraining torque varying inversely with voltage. Furthermore, we connect the current coils to the circuit to be measured through a current transformer having a secondary current varying as the square root of the primary current, i. e., having a ratio varying inversely as the square root of the current.

The invention will be understood more readily from the following detailed description taken in connection with the accompanying drawing, and those features of the invention which are believed to be novel and patentable will be pointed out in the claims appended hereto. In the drawing, Fig. 1 represents schematically the current-conducting windings and the field structures of one embodiment of our invention; Fig. 2 represents schematically the induction disc rotor and damping arrangement cooperating with the portion of the apparatus shown in Fig. 1; Figs. 3 and 4 are graphs explaining the theory of operation of the apparatus illustrated in Figs. 1 and 2; Fig. 5 is a schematic diagram of the assembly and Fig. 6 is a schematic diagram of a modified damping arrangement.

A field structure 11, similar to the field structures employed in watt-hour meters, is provided with a current winding including a pair of sets of cooperating current-conducting coils 12 and 13. The coil 12 corresponds to the potential coil of a watt-hour meter but is preferably wound with heavier wire than the usual potential winding in order to increase the current-carrying capacity. In order to introduce a phase difference in the currents flowing in coils 12 and 13, a resistor 14 is connected in series with one set of current coils, preferably the coils 13. The current coils 12 and 13 are energized by a current transformer 15 having a primary winding 16 connected in series with an alternating-current circuit, the conditions of which are to be measured, and a secondary winding 17 connected to the current coils 12 and 13 in parallel. It will be understood, of course, that the current coils 12 and 13 may also be connected in series if desired, in which case, the resistor 14 will be connected in parallel with one of the sets of current coils. The transformer 15 is provided with a saturable core 18 having a tapering portion 19 of such shape as to vary the saturation in a manner which would cause the current ratio of the transformer to decrease inversely as the square root of the current flowing in the winding 16.

To avoid confusion in the detail drawing, the rotor element cooperating with the field structure 11 is not shown in Fig. 1 but it will be understood that a suitable rotor carrying an induction disc 20, shown in Fig. 2, and driving the usual gear train and register mechanism is to be employed. The assembled structure is however indicated schematically in Fig. 5. As in integrating meters of the induction type well known in the art, the induction disc 20 is arranged to rotate in the air gap 21 of the field structure 11.

A damping device, such as a pair of permanently magnetized damping magnets, not shown, of the type usual in integrating meters may be employed, in which case the apparatus becomes an ampere-hour meter. If, on the other hand, a damping device is provided in which the damping is inversely proportional to the voltage, the meter will register volt-ampere hours or the integral of apparent power with respect to time. In Fig. 2 is illustrated one embodiment of an arrangement for obtaining damping which is inversely proportional to the voltage.

A three-legged core 22 is provided having a middle leg 23 of greater cross section than the other portions of the magnetic circuit and having outside legs 24 and 25, both of approximately the same cross section, but of less cross section than the yoke portions 26 joining the middle leg 23 to the outer legs 24 and 25. The core 22 is composed of transformer iron laminations or of other suitable magnetic material having a variable permeability. Air gaps 27 and 28 are provided in the legs 23 and 25, respectively, and the air gap 27 is preferably shorter than the air gap 28, being great enough, however, to accommodate the induction disc 20 forming the rotor of the meter and cooperating with the field structure 11. A current-conducting winding is provided, which may consist of a pair of coils 29 and 30 connected in series, one coil linking the magnetic circuit including the outer leg 24 and the other coil linking the magnetic circuit including the outer leg 25. It will be understood that the terminals 31 of the windings 29—30 will constitute the potential terminals of the apparatus and will be connected across an alternating-current circuit in which the conditions are to be measured. However, the damping device of Fig. 2 may also be used as a device for producing a restraining torque, decreasing with increase in any desired alternating current flowing through the winding 29—30 and, if desired, an adjustable direct current may be employed as shown in Fig. 6 to provide an adjustable restraining torque of constant value for any predetermined value of direct current. It will be understood that our invention is not limited to the precise core arrangement of Fig. 2, and includes, for example, arranging the core 22 so as to bring the larger cross section leg 23 on the outside as shown in Fig. 5.

It will readily be understood by those skilled in the art that the coils 12 and 13 of the field structure 11 will produce a shifting magnetic field tending to cause rotation of the disc 20 by virtue of the well known induction motor action. To obtain this action, it is essential that the currents in the coils 12 and 13 be out of phase. It will be seen that the resistor 14, being of relatively large resistance compared to the reactance of the coils 13, will serve to maintain a current in the coil 13 substantially in phase with the voltage supplied by the coil 17 of the transformer 15 and likewise, owing to the low reluctance of the magnetic circuit of the coil 12, this coil 12 will have relatively high reactance and the current therein will lag substantially 90 degrees behind the current supplied by the coil 17. The torque produced is proportional to the product of the currents in the coils 12 and 13 and, therefore, proportional to the square of the current output of the coil 17.

The construction of the transformer 15 is such that the secondary current varies as the square root of the primary current. Owing to the fact that flux leakage increases with increase in saturation, the flux linkages of the secondary winding 17 per ampere of primary current of the transformer 15 will decrease as the current in the primary winding increases. This is just another way of saying that the mutual inductance of the coils 16 and 17 decreases or that the ratio of secondary current to primary current or transformer ratio decreases as the primary current increases. By providing a tapered portion 19 having a progressively changing cross section, not only the degree of saturation of the narrowest portion of the magnetic circuit but also the length of the saturated portion of the magnetic circuit for any given primary current in the winding 16 may be so fixed that the increase in leakage flux causes the ratio of the transformer 15 to vary inversely as the square root of the current flowing in the winding 16. The exact shape of the tapering portion 19 of the core 15 will, of course, depend upon the grade of transformer iron employed and the mechanical and electrical dimensions of the remainder of the transformer.

The coils 29 and 30 of the damping mechanism shown in Fig. 2 are so connected as to produce a magnetic flux circulating around the magnetic circuit formed through the outer legs 24 and 25 and the yoke portions 26. The coils 29 and 30, therefore, act in opposition with respect to the middle leg 23 but act together with respect to the outer legs. The magnetic flux produced by the coil 29 will divide and, with relatively low magnetization, a greater portion thereof will flow in the middle leg 23 than in the outer leg 25. However, as the current through the coils 29 and 30 is increased, increasing the magnetization of the core 22, the increasing saturation of the outer leg 24 will cause the flux produced by the coil 29 to taper off. The flux in the middle leg 23 will also taper off. As the current and the saturation of the outer leg 24 increase still further, the coil 30 will tend to send flux through the middle leg 23 instead of the outer leg 24 thus opposing the flux produced by the coil 29 and the flux in the middle leg 23 will gradually drop toward zero. Consequently, the flux crossing the air gap 27 and acting upon the disc 20 will gradually decrease beyond a certain value of current flowing in the coils 29 and 30 or beyond a certain value of voltage applied to the terminals 31. This is illustrated in curve 32 of Fig. 3, in which the range, designated by the arrows, correspond to the range of maximum voltages within which the apparatus is arranged to operate. The curve 32 represents the variation in flux crossing the air gap 27 with variations in direct current flowing through the windings 29 and 30. With alternating current, the curve 32 will be traced twice during every cycle of the alternating-current circuit between a positive and a negative crest, the value of which will be dependent upon the applied voltage. Since the flux linkages of the two coils 29 and 30 are additive, the total flux linkages will vary as shown by curve 33.

In Fig. 4 the dotted sine wave 34 represents instantaneous values of alternating voltage applied to the terminals 31 of the damping device of Fig. 2 and the curve 35 represents the instantaneous values of alternating current flowing in the coils 29 and 30. The curve 35 is of the peaked wave shape characteristic of saturable core conductances with flux linkage curves such as curve 33. When the current in the coils 29 and 30 increases to a predetermined maximum value shown in curve 35, it will be apparent that the instantaneous value of flux crossing the air gap 27 will first increase to a maximum value and then decrease as the magnetizing current follows the curve 35 and approaches its maximum value, for the reason that the instantaneous values tend to follow the direct current curve 32 of Fig. 3. If the average voltage applied to terminals 31 is increased, the height of every point in the curve 35 representing the magnetizing current will also be increased and the instantaneous value of flux crossing the air gap 27 represented by the curve 37 will first increase more rapidly than the current represented by curve 35 until it reaches the same maximum value and will then fall to a lower minimum value owing to a greater saturation effect. The average restraining torque acting upon the disc 20 is dependent upon the average value of the flux. It will be apparent that the curve 37 has a lower average value than the curve 35 and likewise, if the voltage applied to the terminals 31 is further increased, the average of the flux across the air gap 27 will be still further decreased. The average restraining torque acting upon the disc 20 decreases as the average value of the flux decreases. Within the range of voltages to be expected, the restraining torque of the device of Fig. 2 may be made to vary inversely as the voltage by a suitable dimensioning of the parts.

Since an induction disc type of motor, constructed like the usual watt-hour meter, has a torque proportional to the product of the fluxes produced by its two sets of coils and the sine of the electrical angle between them or to the product of the currents in these coils and the sine of the angle, the disc 20 will be acted upon by driving torque proportional to the product of the currents in the coils 12 and 13 and the sine of the electrical angle between these two currents. Owing to the fact that the impedances of the coils 12 and 13 remain substantially constant and both sets of coils are connected to the secondary winding 17 of the transformer 15, the electrical angle between the currents will remain constant and each current will be proportional to the voltage of the winding 17. Thus the driving torque is proportional to the square of the voltage of the winding 17. The latter voltage in turn, as well as the current in the winding 17, is proportional to the square root of the current flowing in the winding 16 and the electric circuit 10 being measured. Accordingly, the driving torque is proportional to the current of the circuit 10. As previously explained, the restraining torque of the damping device 22 or 22' is inversely proportional to the voltage of the circuit 10.

Since the disc 20 is acted upon by a driving torque proportional to current and a restraining torque inversely proportional to voltage, it will be driven at a speed proportional to the product of current and voltage. Therefore, its speed will represent volt-amperes and the number of revolutions it makes will represent the integrated value, volt-ampere hours. It is evident that the rotation of the disc 20 is independent of the power factor of the circuit to which the apparatus is connected and depends on the current and voltage, so that the value obtained is the apparent power and not the real power.

In accordance with the provisions of the patent statutes, we have described the principle of operation of our invention together with the apparatus which we now consider to represent the best embodiment thereof but we desire to have it understood that the apparatus shown is only illustrative and that the invention may be carried out by other means.

What we claim as new and desire to secure by Letters Patent of the United States, is:

1. A volt-ampere hour meter comprising in combination, an ampere squared torque-producing unit having a rotatable element and stationary current coils acting thereon, a damping unit producing a restraining torque varying inversely with voltage, and a current transformer connected to said current coils and having a ratio varying inversely as the square root of the current.

2. In combination, a meter having a movable element and a current-conducting winding acting upon said movable element with a torque varying as the square of the current, and a current transformer connected to said current winding and having a ratio varying inversely as the square root of the current.

3. In an integating meter, a rotatable element, means for producing a torque acting on said element proportional to a current, and a damping unit with a current-conducting winding and acting upon said rotatable element with a restraining torque varying inversely as the voltage in its winding.

4. In an integrating meter, an induction type rotatable element, a current-conducting winding acting thereon and a restraining torque unit also acting upon said rotatable element, said restraining torque unit comprising a magnetic core providing parallel magnetic flux paths, the flux in one of which cooperates with said rotatable element as damping flux, and means including a current-conducting winding for shifting the flux from said damping flux path to the other path as the current in said latter winding increases.

5. A damping arrangement for a rotating device comprising in combination with an induction rotor, a magnetic core having a middle leg and two outer legs and a current-conducting winding with parts acting in opposition with respect to said center leg but aiding each other with respect to the outer legs, one of said outer legs having an air gap in its magnetic circuit and said middle leg having an air gap therein shorter than said first mentioned air gap and having said induction rotor rotatable therein.

6. A damping arrangement for a rotating device comprising in combination with an induction rotor, magnetic core means comprising variable permeability magnetic material and providing parallel magnetic circuits each containing an air gap, one air gap being shorter than the other, and a winding with a part linking only one of said magnetic circuits and a part linking both magnetic circuits, said induction rotor being rotatable in said shorter air gap.

7. A damping arrangement for a rotating device comprising in combination with an induction rotor, magnetic core means comprising variable permeability magnetic material and providing a magnetic circuit including parallel portions with air gaps in each of the parallel portions, and a current-conducting magnetizing winding mounted on said core means, said induction rotor being rotatable in one of said air gaps.

THOMAS A. ABBOTT.
ALLEN T. SINKS.

CERTIFICATE OF CORRECTION.

Patent No. 2,048,534.

July 21, 1936.

It is hereby certified that error appears in the above numbered patent requiring correction as follows: In the grant, the name of the first mentioned patentee should have been written and printed as Thomas A. Abbott instead of "Thomas A. Abott"; page 2, second column, line 31, for the word "correspond" read corresponds; and that the said Letters Patent should be read with these corrections therein that the same may conform to the record of the case in the Patent Office.

Signed and sealed this 29th day of September, A. D. 1936.

Henry Van Arsdale
Acting Commissioner of Patents.

(Seal)